United States Patent [19]
Dory

[11] 3,754,472
[45] Aug. 28, 1973

[54] APPARATUS FOR ANALYSING BY MEANS OF ULTRASONIC PULSES, EMPLOYING THE REFLECTING PROFILE CHARACTERISTIC OF EACH OBSTACLE

[75] Inventor: Jacques Dory, 91, rue des Molvaux, 77 Coupvray, France

[73] Assignee: Realisations Ultrasoniques, Paris, France

[22] Filed: Mar. 4, 1971

[21] Appl. No.: 120,851

[30] Foreign Application Priority Data
July 24, 1969 Great Britain .................. 25,337/69

[52] U.S. Cl. ............................................. 73/67.9
[51] Int. Cl. .......................................... G01n 21/00
[58] Field of Search .................... 73/67.1, 67.8, 67.9

[56] References Cited
UNITED STATES PATENTS

| | | |
|---|---|---|
| 3,481,186 | 12/1969 | Cellitti et al. ........................ 73/67.9 |
| 3,548,641 | 12/1970 | Mitchell .............................. 73/67.9 |
| 3,512,399 | 5/1970 | Weinbaum ....................... 73/67.8 R |
| 3,572,097 | 3/1971 | Kleesattel ............................ 73/67.1 |
| 3,540,265 | 11/1970 | Lynnworth...................... 73/67.1 X |
| 3,292,018 | 12/1966 | Clynes............................ 73/67.8 R |

Primary Examiner—Richard C. Queisser
Assistant Examiner—Arthur E. Korkosz
Attorney—William Anthony Drucker

[57] ABSTRACT

For analyzing discontinuities which perturb the propagation of acoustical waves in a given medium, in particular for detecting flaws in a mechanical piece, there is provided an apparatus comprising means for dividing each of the echo signals reflected from the discontinuity into a plurality of elementary signals having predetermined relative amplitude and time delays and means for establishing the sum of said elementary signals.

The position, shape and dimensions of the discontinuity are determined with better precision than in conventional devices.

5 Claims, 4 Drawing Figures

APPARATUS FOR ANALYSING BY MEANS OF ULTRASONIC PULSES, EMPLOYING THE REFLECTING PROFILE CHARACTERISTIC OF EACH OBSTACLE

The present invention relates in a general way to the analysis of discontinuities or obstacles which perturb the propagation of acoustical waves in a given medium.

It is known that the presence of obstacles in the path of an acoustical wave gives rise to phenomena of reflection, refraction and diffraction. Two types of known analyzing methods are based on this: the "reflection" method which is the most often employed, and the "transmission" method.

To simplify the ensuing description, reference will be made solely to the method employing the reflection of pulses. However, it must be understood that the invention is equally applicable to the transmission method.

The object of the analysis is as a rule and in a general way to ascertain, with the highest possible precision, the position, shape and dimensions of the obstacles.

Thus, it can concern the measurement of thicknesses, levels or distances, or the detection of obstacles and the study of their nature and characteristics. In the ensuing description, reference will more particularly be made to the detection and examination of flaws in mechanical parts, namely what is usually known as nondestructive inspection. However, it must be understood that the scope of the invention is not intended to be limited to this type of applications.

Known nondestructive inspection apparatuses employing supersonic echoes usually afford only a rough estimation of the size of the flaw. Indeed, they merely measure the intensity of the acoustical energy reflected in the direction of the receiver probe (the latter usually also performs the function of the transmitter or sender and this could be the case in the present invention) most often by displaying on the screen of a cathode-ray tube whose horizontal deflection is proportional to time, the amplitude of the flaw echoes.

This method is based on the very approximate hypothesis that the intensity of the echo depends only on the dimensions of the obstacle. This leads to considerable errors, in particular as soon as the orientation of the obstacle relative to the supersonic sounding beam materially deviates from the perpendicular. In practice, the conventional method in no way attempts to give a precise determination of the dimensions and shape of the obstacles.

Some efforts have been made to improve the resolving power of the analyzing device.

In particular, in French Patent Application filed on Aug. 23, 1968 by the Applicant and entitled "Device for the analogical sampling of recurrent signals" a nondestructive inspection process is described which permits a reduction in the noise which normally results from decreasing the duration of the sounding pulses, the latter decrease being intended to increase the fineness of the analysis.

This process comprises an analogical sampling of the echo signals by means of a matrix of capacitors. In a particular embodiment, a certain number of successive cycles of the signal received are applied to the sampling matrix with delays which are respectively increasing and adjustable, and the gain of the receiver amplifier is variable in an adjustable manner as a function of said delays. This finally permits the superimposition on each of the pseudo-sinusoidal components of the signal received, of a signal of the same form shifted in phase half a period and having such amplitude that the sum of the two signals has only the first oscillation of the signal received.

Thus, there is somewhat obtained, it is true at the price of a relatively complex sampling and storage process, an analysis result equivalent to that which would be obtained by means of a very brief sounding pulse devoid of parasite oscillations.

However, such a process is limited in its possibilities of application and the object of the present invention is first to considerably widen the scope by providing a general means, employing no use of storage, for achieving a sounding equivalent to that which would be effected with an ideally brief and pure pulse with the aid of a generator of more or less imperfect pulses such as those it is possible to design in practice.

The present invention provides a process wherein the signal which is perturbed by the obstacle and supplies the information relating to the latter is, for each sounding cycle, divided into a plurality of elementary signals each of which possesses relative to the other signals predetermined relative amplitude and delay whereby the sum of said elementary signals substantially reproduces what will be termed the "reflecting profile" of the obstacle.

The notion of reflecting profile will be explained in detail hereinafter. For the moment, it will merely be stated, first, that the form of the perturbed signal appears to reproduce substantially the reflecting profile of the obstacle if the sounding pulse is infinitely brief (which could never be the case in practice) and, secondly, that the knowledge of this reflecting profile provides information on the various characteristics of the obstacle which is as complete as possible.

Thus, by means of the invention, it is possible to achieve, by starting with a very imperfect sounding signal, an analyzing quality which is equivalent to that which is possible to achieve by starting with an ideally brief pulse, and this by means of a very general process of application, employed in each cycle, with no sampling and by means of devices which may be very diverse, since the dividing up of the information-carrying signal and the amplitude modification and delay of the elementary signals which it comprises, can be effected at different points of the analyzing apparatus, in particular, either at the input of the electronic receiver, or even in the transducers by means of various techniques.

According to an important feature of the invention, said amplitude modification and delay of the elementary signals are so determined that, if $y$ is the time stagger of an elementary signal, $r(y)$ a factor by which its amplitude is multiplied in the apparatus and $f(t)$ the intensity of the sounding signal at the transmission instant $t$, the function $r(y)$ is calculated from a formula having the form $r_p = 1/f_p$, $r_p$ and $f_p$ being the transformed curves of Laplace of the functions $r(y)$ and $f(t)$.

Thus, the invention provides a precise method of calculating the delay and the amplitude transformation factor of the elementary signals.

Another object of the invention is to provide various embodiments of the analyzing apparatus for carrying out the above-defined process.

These embodiments, to which the invention not intended to be limited, will now be described in detail with reference to the accompanying drawing in which.

Figure 1:
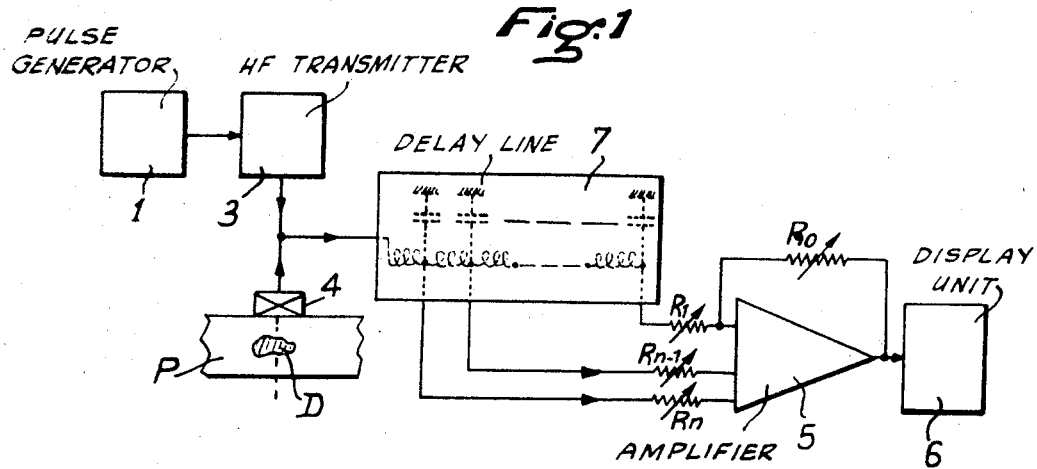
FIG. 1 is the block diagram of a supersonic inspection apparatus employing a delay line having multi-taps in its receiver circuit.

In FIG. 1 there is shown a nondestructive inspection apparatus for inspecting a part P containing flaws D. This apparatus comprises as known per se: a generator 1 generating repetitive electrical pulses, a high-frequency transmitter 3 modulated by these pulses, a transmitter-receiver transducer 4 in contact with the part to be examined, a receiver amplifier 5 and an element 6 using the signals from this amplifier. The element 6 can be a cathode-ray oscillograph or any other appropriate device displaying, recording or treating the information which relates to the flaw D and is contained in the signal perturbed by the pressure of this flaw, that is, the echo formed by the reflection of the supersonic pulses on this flaw.

The particular feature of the described apparatus resides in the presence of a delay line 7 provided with multi-taps, respectively connected to the input of the amplifier 5, which operates as a mixer, through adjustable resistors $R_1 \ldots R_{n-1}, R_n$. A resistor $R_o$ connects the input of the amplifier 5 to its output.

A delay line 7 has been shown of the type having localized constants comprising capacitors and inductance coils. However, it must be understood that it may be replaced by a line having distributed constants.

The resistors $R_1 \ldots R_n$ must have values which are distinctly higher than the characteristic impedance of the delay line so as to avoid perturbing the propagation of the signal in the latter.

The output voltage of the amplifier is:

$$V_s = \left( \frac{V_1}{R_1} + \frac{V_2}{R_2} + \cdots \frac{V_n}{R_n} \right) R_o.$$

In other words, the information-carrying signal is, at the output of the receiver, the sum of $n$ elementary signals having amplitudes respectively proportional to $1/R_i = r(y_i)$, $y_i$ being the delay undergone by the elementary signal received at the tap of row $i$.

It has been possible for the Applicant to demonstrate by a calculation, which is outside the scope of this description, and verify by experiments, that when the coefficients $R_i$ and $y_i$ are so chosen that the transformed curve of Laplace of the function $r(y_i)$ is the inverse of the transformed curve of Laplace of the function $f(t)$ which defines the intensity of the transmission pulse generated by the transducer 4, the output signal $V_s$ reproduces substantially the reflecting profile of the flaw D.

Therefore, by starting with a transmission pulse of strictly known form, it is possible to calculate the coefficients $R_i$ and $y_i$ which are to be employed in the diagram shown in FIG. 1.

What is meant by "reflecting profile" of an obstacle and the interest of this notion will now be explained.

By virtue of Huyghen's principle, any obstacle located in the path of an acoustical wave is equivalent, from the point of view of perturbation of an incident wave, to an assembly of elementary obstacles of small sizes. More precisely, the energy returned by the obstacle to the transmitting source is the sum of the energies radiated by said elementary sources which are considered to be omnidirectional sources.

Now, the energy of each elementary source is proportional to the intensity of the incident wave at the considered point and a function of the reflecting power of the elementary source.

If all the elementary sources located between the distances $x$ and $x + dx$ from the transmitting source are considered, their reflecting power is a certain function $R(x)$ which is proportional to the sum of the densities of said elementary sources each bearing a ponderation coefficient which is proportional to their own reflecting coefficient. This function $R(x)$ is termed the "reflecting profile" of the obstacle.

The energy reflected by the obstacle in the direction of the transmitting source is therefore finally calculated by the integration of the product of the function $R(x)$ by the intensity of the incident wave at the abscissa point $x$. The latter intensity, if it is assumed that it concerns a plane wave (which is practically the case when the opening of the beam is small and the distance between the obstacle and the source much greater than the size of the obstacle) is itself proportional to $(1/x^2)f(t - x/C)$, $C$ being the velocity of propagation of this wave; so that the total reflected energy is given by the formula $$Jr(t) = \int_{-\infty}^{+\infty} \frac{1}{2} f\left( t - \frac{x}{c} \right) R(x) dx.$$

Thus, there is a well-defined relation between the reflecting profile of the obstacle, the function $f(t)$ which defines the profile of the transmission pulses, and the energy reflected by the obstacle in the direction of the transmission source.

Note that when the function $f(t)$ is a harmonic, if $\omega$ is its pulsation, the function $\iota r(t)$ is a function of $\omega$, namely $g(\omega)$. This function $g(\omega)$ is termed the "transfer function" of the obstacle.

Applicant has been able to demonstrate that this transfer function is, to within a coefficient, the transformed curve of Fourier of the function $R(x)$.

Thus, there is a simple relation between the reflecting profile of the obstacle and its transfer function such as defined and employed in French Patent Application filed on June 6, 1969 by the Applicant and entitled "Process and apparatus for analyzing materials by supersonic pulses employing the transfer function characteristic of each obstacle."

However, the process according to the present invention has for purpose to obtain directly the reflecting profile and is completely different in its principle and practical application from that disclosed in the aforementioned prior Patent Application.

In order to bring out more clearly the practical interest of this complex notion of reflecting profile, there will be considered the purely theoretical case where the transmission pulse is a DIRAC pulse (an infinitely brief pulse the energy of which is not nil).

Applicant has been able to demonstrate that in this case the profile of the echo strictly reproduces that of the reflecting profile of the obstacle.

This remark supplies a strict theoretical explanation of the empirical observation of that fact that sounding effected with very brief pulses gives particularly interesting analysis results since knowledge of the reflecting profile finally represents, better than that of the transfer function, optimum information that it is possible to obtain about the obstacle.

Moreover, it suggests the basic idea of the invention, since the latter finally consists in furnishing a simple and practical means for transforming, in the analysis apparatus, the signals perturbed by the obstacle, so that they assume substantially the same form as if the transmission pulse employed were in fact a Dirac pulse.

The relation between the form and dimensions of the obstacle, on one hand, and its reflecting profile, on the other, is usually rather simple in practical cases of utilization.

Indeed, in respect of a homogeneous obstacle of small dimensions and a narrow analyzing beam, it can be shown that the function $R(x)$ has for value the area of projection, on a plane perpendicular to the direction of propagation, of the surface elements of this obstacle between the abscissa points $x$ and $x + dx$.

For example, in respect of a square obstacle which has a side $a$ and a plane which is inclined at an angle $\alpha$ to the axis of the beam, and once side perpendicular to this axis and the centre located at a distance $d$ from the transmitter, there is obtained the simple relation $R(x) = a \sin \alpha$ for $d - (a/2) \sin \alpha < x < d + (a/2) \cos x$ and $R(x) = 0$ for all values of $x$ outside this interval.

The function $R(x)$ is therefore a rectangular signal.

In respect of a circular obstacle having a radius $r$ and a plane which is inclined at an angle $\alpha$ to the axis of the beam and located at a distance $d$ from the transmitter there is obtained the simple relation:

$$R(x) = 2 \sin \alpha \sqrt{r^2 - (x - d)^2 \cos^2\alpha}$$

for $d - r < x < d + r$ and $R(x) = 0$ for $x > d + r$ and $x < d - r$

The function $R(x)$ is then represented by an arc of an ellipse.

These examples are not intended to limit the scope of the invention and in a large number of practical cases the knowledge of the reflected profile enables the determination of the shape and the calculation of the dimensions and orientation of the obstacle to be effected very simply.

The element 6 can therefore comprise calculating circuits capable of furnishing directly the characteristics of the obstacle.

It should be mentioned that although the method for calculating the parameters $y_i$ and $R_i$ indicated hereinbefore theoretically, enables the reflecting profiles of the obstacle to be, strictly speaking, ascertained, in practice satisfaction will be attained with approximate results capable of being obtained with a reasonable pass band of the circuit of the apparatus and with a discontinuous variation of the function ion $r(y)$ (the delay line 7 only having a finite number of taps affording a finite number of discrete values of the delays $Y_i$).

Figure 2:
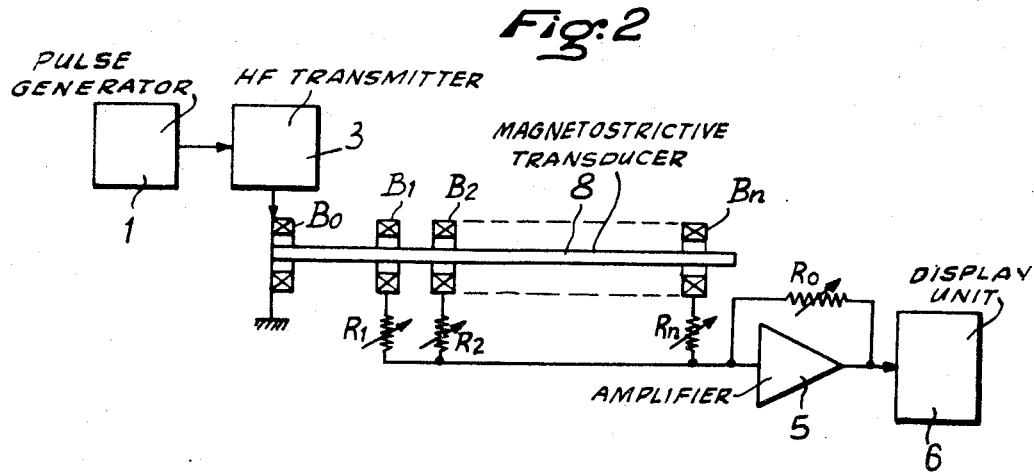
FIG. 2 shows another embodiment employing a transducer of the magneto-strictive type.

In the modification shown in FIG. 2, the reference numerals $1 - 3 - 5 - 6$ and $R_o$ designate elements which are the same as those shown in FIG. 1. The transmitter 3 is connected to the winding $B_o$ of a magnetostrictive transducer comprising a wire 8 along which are arranged windings $B_1, B_2 \ldots B_n$ connected to the input of the amplifier-mixer 5 through resistors $R_1, R_2 \ldots R_n$.

In this modification, the delays $Y_i$ are adjustable by modifying the position of the coils along the wire.

Instead of interposing delay means between the transducer and the receiver, it is possible to employ for the purpose of generating the elementary signals a plurality of small auxiliary transducers performing the function of acoustical receivers associated with the main transmitter-receiver transducer.

Figure 3:
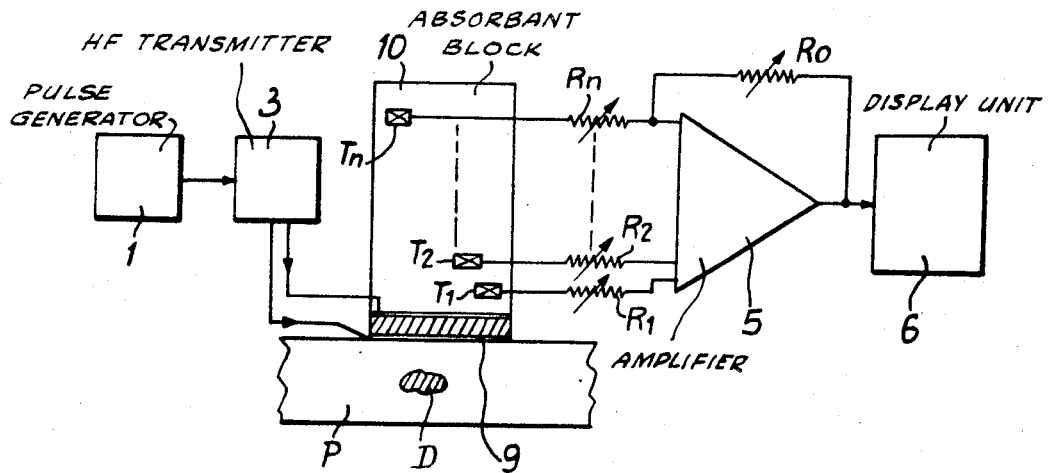
FIG. 3 illustrates another embodiment in which the elementary signals are delayed by the use of auxiliary receiver transducers incorporated in an absorbent block, and, FIG. 4 shows a modification in which the elementary signals are obtained by reflections on reflecting elements incorporated in an absorbent block.

Such an embodiment is shown in FIG. 3.

Incorporated in a block 10 of material absorbing ultrasounds are these auxiliary transducers $T_1, T_2 \ldots T_n$ which are of the piezoelectric type and respectively connected to the input of the amplifier-mixer 5 through the resistors $R_1, R_2 \ldots R_n$.

The block 10 bears on the rear face of a piezoelectric transmission transducer 9 which is excited by the transmitter 3 and in contact with the part P to be sounded.

The auxiliary transducers have sufficiently small dimensions for reflecting only a negligible fraction of the acoustical pulse transmitted by the transducer 9 so that the form of this pulse is substantially unaltered.

The regulation of the amplitude of the echo signals received by the auxiliary acoustical receivers is effected by means of resistors $R_1, R_2 \ldots R_n$, but the position of said receivers determines once and for all the values of the delays $Y_i$. In this embodiment, the latter correspond to the time of propagation of the ultrasounds in the absorbent material between the auxiliary receivers.

Figure 4:
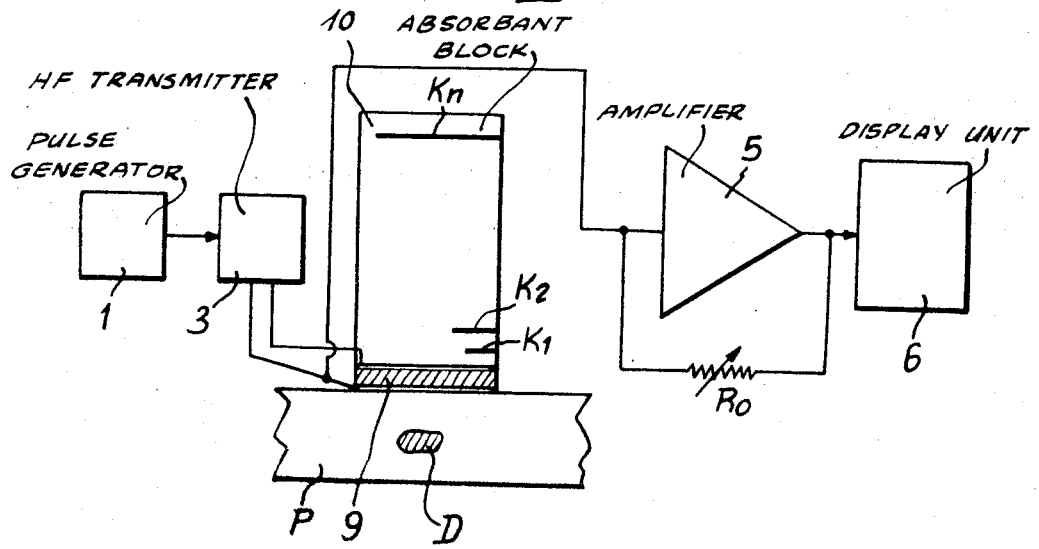

An arrangement of the same type is illustrated in FIG. 4. The auxiliary transducers shown in FIG. 3 are here replaced by simple acoustical reflectors $K_1, K_2 \ldots K_n$ incorporated in the absorbent block 10. The echo signal received by the transmitter-receiver transducer 9 is transmitted to the amplifier-mixer 5 through adjustable resistors $R_1, R_2 \ldots R_n$. The signal given out by the transducer 9 is the sum of several elementary pulses, namely:

the pulse sent out directly by the face of the transducer in contact with the part P;

the pulses sent out by the rear face of the transducer reflected by the various reflectors and therefore delayed for periods which are respectively proportional to the times of propagation between said rear face and the respective reflectors.

The amplitudes of these various pulses are a function of the area of the reflectors.

The echo signal produced by the transmitter 9 and applied to the input of the amplifier 5 is likewise the sum of the elementary echo pulses corresponding to the transmitted elementary pulses.

In this embodiment no electrical element for regulating the amplitude and the delays of the elementary signals is provided and only a calculation enables them to be determined once and for all.

It must be understood that the process according to the invention can be carried out with other means for delaying and regulating the amplitude of the elementary signals. In particular, these means could be numerical instead of analogic, as in the described embodiments. The delays could then be obtained by the use of staggering registers and the amplitude adjustments could be obtained by means of amplitude selectors associated with these registers.

I claim:

1. Apparatus for analyzing discontinuities or obstacles which perturb the propagation of acoustical waves in a given medium, said apparatus comprising means for directing a beam of waves corresponding to brief repetitive acoustical signals towards the obstacle to be analyzed; receiver means for receiving said beam of waves after transmission through the medium containing the obstacle; further means for producing from each of the acoustical signals which form the received beam of waves a plurality of elementary signals each one of which possesses, relative to the other, elementary signals, a predetermined relative amplitude and time delay; mixer means for establishing the sum of said elementary signals, and read-out means connected to the output of said mixer means, the said further means being so determined that the respective time delays and amplitudes of the elementary signals are such that if $y$ is the time delay of an elementary signal, $r(y)$ a factor by which its amplitude is multiplied and $f(t)$ the amplitude of the acoustic signal at the time t when it is directed towards the obstacle, the function $r(y)$ is calculated from a formula having the form $r_p = 1/f_p$, $r_p$ and $f_p$ being the Laplace transformed functions for the functions $r(y)$ and $f(t)$.

2. Apparatus as claimed in claim 1 wherein said further means comprise: a delay line having a plurality of taps, said delay line having an input connected to the output of said receiver means and a plurality of adjustable resistors connecting the respective taps to the input of said mixer means, the distribution of respective taps along the delay line and the resistance values of the respective resistors being so determined that predetermined relative amplitudes and time delays are obtained.

3. Apparatus as claimed in claim 1, wherein said transmitter-receiver further means include a magnetostrictive transducer having an elongate magnetostrictive element and a plurality of coils distributed along said element; said further means further including a plurality of adjustable resistors connecting the respective coils to the input of the mixer means, the distribution of the respective coils along said element and the resistance values of the respective resistors being so determined that predetermined relative amplitudes and time delays are obtained.

4. Apparatus as claimed in claim 1, wherein said transmitter and receiver means include an ultrasonic transmitter-receiver transducer having a first face in contact with said medium and an opposite face; said further means including a block of material absorbing the ultrasounds placed against said opposite face; the said respective distances being so determined that predetermined relative amplitudes and time delays are obtained, said first face of the transmitter-receiver transducer being connected at the input of the mixer means.

5. Apparatus as claimed in claim 1, wherein said transmitter and receiver means include an ultrasonic transmitter-receiver transducer having a first face in contact with said medium and an opposite face; said further means including: a block of material absorbing ultrasounds against the opposite face, a plurality of ultrasonic receiver transducers incorporated in said block at predetermined respective distances from said opposite face, and a plurality of adjustable resistors connecting the respective receiver transducers to the input of said mixer means, the respective distances of the receiver transducers and the resistance values of the respective resistors being so determined that predetermined relative amplitudes and time delays are obtained.

* * * * *